March 15, 1966     L. A. BLATTNER     3,240,313
DUAL AUGER CONVEYOR
Filed Oct. 23, 1963     2 Sheets-Sheet 1
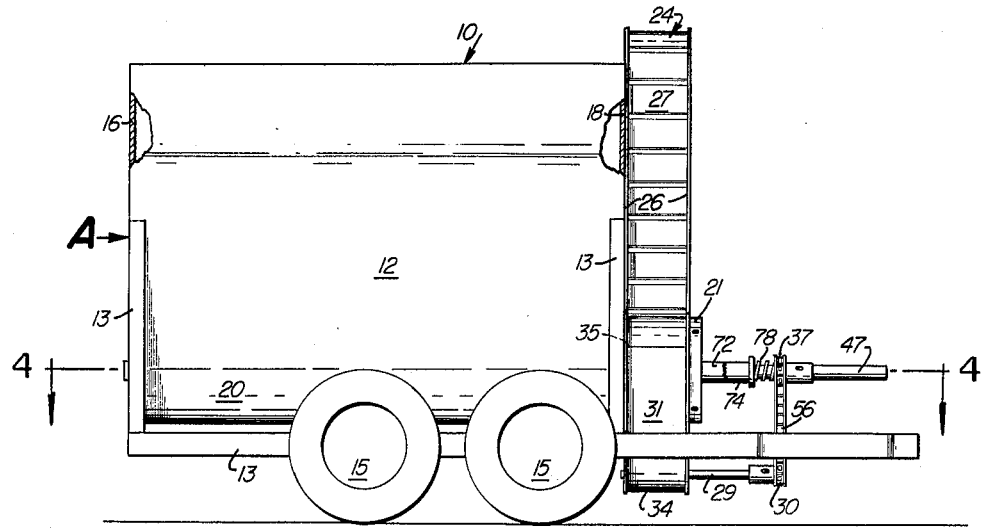
FIG. 1
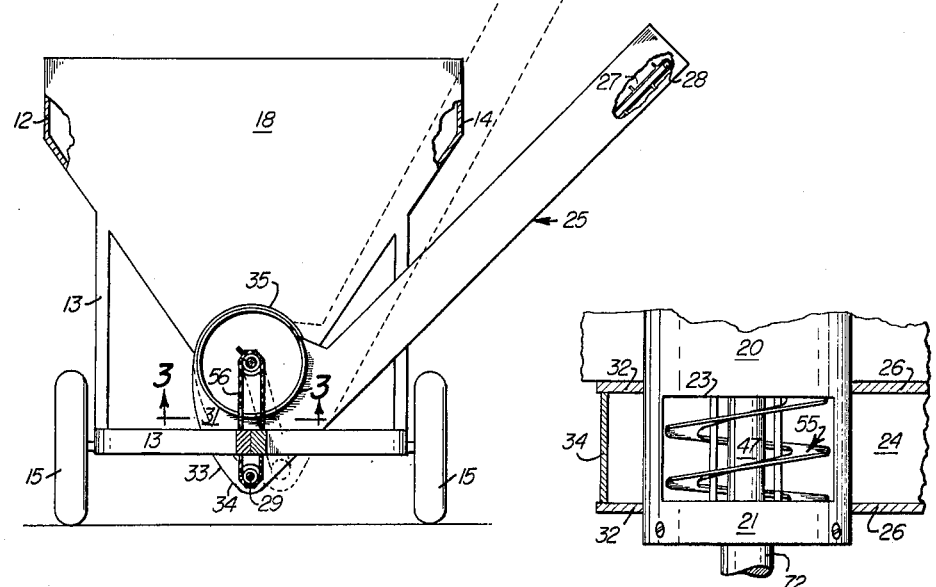
FIG. 2
FIG. 3
INVENTOR.
LESTER A. BLATTNER, DECEASED,
BY EMMA BLATTNER, ADMINISTRATRIX
BY *William F. Woods*
ATTORNEY March 15, 1966  L. A. BLATTNER  3,240,313
DUAL AUGER CONVEYOR Filed Oct. 23, 1963  2 Sheets-Sheet 2

INVENTOR.
LESTER A. BLATTNER, DECEASED,
BY EMMA BLATTNER, ADMINISTRATRIX

BY William F. Woods
ATTORNEY

United States Patent Office 3,240,313
Patented Mar. 15, 1966

3,240,313
DUAL AUGER CONVEYOR
Lester A. Blattner, deceased, late of Bismarck, N. Dak., by Emma Blattner, legal representative, Star Rte. 2, Bismarck, N. Dak.
Filed Oct. 23, 1963, Ser. No. 318,459
5 Claims. (Cl. 198—64)

This invention relates to material conveying apparatus; in particular, it concerns a novel and improved device for handling and conveying livestock feed of varying size and composition ranging from finely ground grain to chopped forage and ear corn.

Briefly, this invention differs from conventional granular material conveyors in that several functions or operations may be performed with a single piece of equipment. Heretofore, if one wanted to distribute on the one hand large size feeding material such as ear corn or silage it was necessary to use a large diameter conveyor auger. If small sized grains were to be handled and conveyed, it was necessary to use a smaller conveyor auger. In addition, such single auger conveyors are not self cleaning and are not suited for efficiently mixing livestock feed and grains.

It is, therefore, an important object of this invention to provide means for overcoming the above disadvantages and limitations.

Another primary object of this invention is to provide an improved device for handling and conveying livestock feeds and similar material, mixing such material in an efficient manner, and having self-cleaning characteristics.

Another object of this invention is to provide an improved material handling device adapted to selectively convey livestock feed of various size and character without the necessity of changing parts or adding components.

A further object of this invention is to provide a device of the class described that may be readily manufactured of ordinary materials, that is low in cost and extremely rugged in design.

These and other objects and advantages of the invention will become more fully apparent from a consideration of the following detailed description and accompanying drawings wherein an illustrative embodiment of the invention is shown.

In the drawings:

FIGURE 1 is a side elevation view, with parts broken away, of the invention;

FIGURE 2 is a front elevation view, with parts broken away and with the discharge conveying system shown in an alternate position in dotted lines, of the invention;

FIGURE 3 is a fragmentary view, partially in section, taken on the line 3—3 of FIGURE 2;

Figure 4:
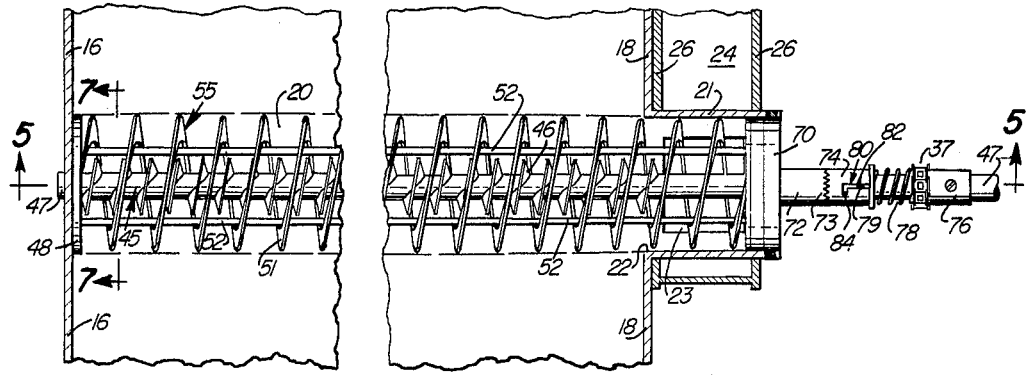
FIGURE 4 is a fragmentary longitudinal plan view, with parts in section, taken on the line 4—4 of FIGURE 1.

Generally speaking, according to the principles of the invention, a hopper shaped mobile body is provided having a built-in dual auger material handling system adapted to deliver granular solids of varying character to a side mounted adjustable conveyor for discharge into a bin, truck or the like. The dual auger system allows for mixing of the material before its delivery to the discharge conveyor and also self cleans the hopper body.

Referring to the drawings, the invention, designated in its entirety by the reference character A, includes a hopper shaped body 10 having inclined converging side walls 12, 14 and vertical end walls 16, 18. A supporting frame 13 and wheels 15 may also be provided. Side walls 12, 14 terminate at their lower ends in a longitudinal semi-tubular upwardly open lower housing 20. Lower housing 20 is closed at its rear by wall 16 and communicates at its forward end with a forwardly extending hollow cylindrical housing 21 by virtue of a circular opening 22 in forward end wall 18. A discharge opening 23 is formed in the bottom of forward housing 21 immediately in front of end wall 18.

The material contained in body 10 is transported, as will be explained, from lower housing 20 through discharge opening 23 of cylindrical housing 21 into an auxiliary side delivery conveyor 24, which is mounted in rotatable cooperative relationship to cylindrical housing 21. Conveyor 24 consists of a belt-mounting chute 25 having longitudinal side walls 26 enclosing a conveyor belt 27 that is carried between an upper rotatable guide axle 28 and a lower drive axle 29. The forward end of lower drive axle 29 is equipped with a driven sprocket 30. Rotatable mounting connection between conveyor 24 and cylindrical housing 21 of body 10 is accomplished by virtue of an enclosing lower shroud 31 formed integral with chute 25. Shroud 31 is characterized by a pair of spaced front and rear walls 32 having arcuate inner edges 33 connected by a curved bottom wall 34 so as to partially envelop cylindrical housing 21. The free end of bottom wall 34 (that is, the end remote from chute 25) is connected to walls 32 by spaced circular rings 35 to allow conveyor 24 to rotate about cylindrical housing 21 whereby to permit the angle of chute 25 to be varied during the discharge operation. It should be noted that the curved bottom wall 34 of shroud 31 during all angular movements of chute 25 below the vertical is in an underlying relation to the lower discharge opening 23 of cylindrical housing 21. The material delivered from body 10 to chute 25 is thus conveyed by means of belt 27 to its point of discharge without loss, regardless of the angular movement of chute 25 in the manner described.

Figure 5:
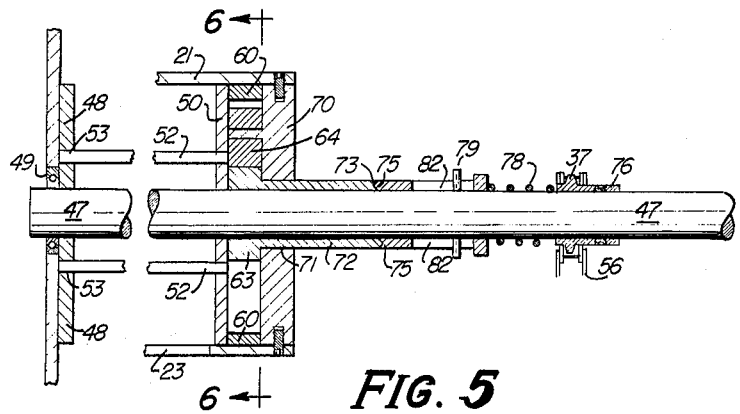
FIGURE 5 is an enlarged fragmentray view, partially in section, taken on the line 5—5 of FIGURE 4.
Figure 6:
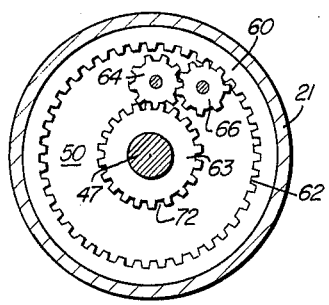
FIGURE 6 is a view, partially in section, taken on the line 6—6 of FIGURE 5.
Figure 7:
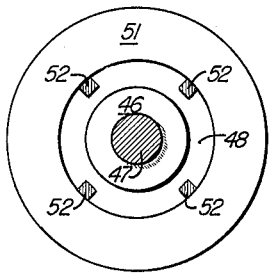
FIGURE 7 is a view, similar to FIGURE 6, taken on the line 7—7 of FIGURE 4.

The means for delivering granular and other bulk material from body 10 to conveyor 28 are shown in FIGURES 4-6. This may be termed a dual auger conveyor system, for it includes an inner auger 45 and an outer auger 55, the outer auger 55 being arranged in parallel concentric co-axial relationship with the inner auger 45. Inner auger 45 includes a conventional solid screw element 46 mounted on a rotatable supporting shaft 47. A centrally bored circular rear end member 48, abuttingly engageable with the rear of screw 46, serves as a rear thrust bearing for shaft 47 which extends therethrough into mounting relationship with a suitable bearing 49 in body 10. The forward end of screw 46 terminates in register with the lower discharge opening 23 of cylindrical housing 21, with the forwardly extending portion of shaft 47 being carried by a centrally bored forward circular end member 50 contained within cylindrical housing 21 just forwardly of opening 23.

The outer auger 55 is formed between circular end members 48 and 50 by virtue of an annular longitudinal screw element 51 connected at each end thereto. The outer surface of screw element 51 is generally coplanar and corresponds in diameter to forward end member 50. The inner surface of screw element 51 is in spaced relation to inner auger 45 with sufficient clearance being provided for the movement of material between augers 45 and 55. Longitudinal stability is afforded by a series of four circumferentially spaced support bars 52 rigidly secured to the inner surface of screw element 51 and attached at their forward ends to forward end member 50. The rear ends of support bars 52 extend into holes 53 in rear end member 48.

It will be understood from the foregoing that the rotation of shaft 47 results in the operation of inner auger 45 and delivery of material from lower housing 20 to auxiliary conveyor 24 through opening 23 in cyclindrical housing 21. Driving connection between shaft 47 (normally operated by a power take off or other external means not shown) and the lower drive shaft 29 of conveyor 24 is accomplished by means of an endless chain 56 connecting driven sprocket 30 on shaft 29 to driving sprocket 37 on shaft 47. To permit the selective operation of outer auger 55 simultaneously with the rotation of inner auger 45, a reduction gearing and clutching system is provided. This includes a ring gear 60 having internal teeth 62 rigidly connected to the forward face of end member 50. A drive gear 63, freely rotatable about and carried by shaft 47 within ring gear 60, is operatively connected to ring gear 60 by pinions 64, 66 which are carried by a fixed plate 70 secured to the forward end of cylindrical housing 21. Fixed plate 70 has a central bore 71 through which extend shaft 47 and axial sleeve 72 of drive gear 63. The forward end of sleeve 72 is provided with a plurality of teeth 73. A slidable clutching sleeve 74 having a plurality of teeth 75 matingly engageable with the teeth 73 of sleeve 72 is mounted on shaft 47 between the hub 76 of the driving sprocket 37. A coil spring 78 is surroundingly carried by shaft 47 between hub 76 and sleeve 74 to normally bias clutching sleeve 74 into driving engagement with gear 63. To remove and hold clutching sleeve 74 from engagement with gear 63, a radially extending pin 79 is mounted in shaft 47 forwardly of sleeve 74. Diametrically opposed slots 80 in sleeve 72, formed with an axial leg 82 and a circumferential leg 84, permit the withdrawal of sleeve 74 from contact with sleeve 72 against the pressure of spring 78. By sliding sleeve 74 forwardly with pin 79 in slots 82 and rotating it with pin 79 in slots 84, sleeve 74 is brought out of engagement with sleeve 72 and locked thus disengaging outer auger 55 from shaft 47. In this position, only inner auger 45 is allowed to rotate. When sleeve 74 is rotated and allowed to slide rearwardly, its teeth 75 engage teeth 73 of sleeve 72 whereby to cause ring gear 60 and outer auger 55 to rotate upon the rotation of shaft 47. In this condition, both inner auger 45 and outer auger 55 rotate, with the inner auger 45 revolving at about one-fifth the speed of the outer auger 55 by virtue of the gear drive discussed hereinabove. This speed differential has been found to be the most suitable for conveying and mixing operations with a 9" diameter inner auger and a 20" diameter outer auger. It will be understood, of course, that both augers rotate in the same direction.

Although a mobile hopper body 10 is shown in the drawings, a feed box mounted on an ordinary farm wagon could be used instead. In use, the inner auger 45 is operated directly from a PTO shaft of a tractor with the aforementioned gear reduction and clutching system being used to engage the outer auger 55 for simultaneous operation with inner auger 45. When grain, ground feed, pellets and the like are conveyed, only the inner auger 45 is used until body 10 is nearly empty. Then outer auger 55 is engaged to clean out the bottom of housing 20. When silage, chopped forage, ear corn or any other coarse material is conveyed both the inner auger 45 and the outer auger 55 are used throughout the unloading process. For mixing operations, both augers are used. The operation of one auger inside of another auger makes it possible to perform mixing and conveying operations that heretofore required at least two machines.

It is understood that suitable modifications may be made in the structure as disclosed without departing from the spirit and scope of the invention as set forth in the following appended claims.

What is claimed is:

1. Material handling apparatus comprising a hopper body having downwardly converging side walls in communication with an upwardly open semi-cylindrical auger housing, a hollow cylindrical housing extending outwardly of said body and coaxial with and communicating with the said semi-cylindrical housing, an inner auger rotatably mounted within the said semi-cylindrical housing, an outer auger rotatably mounted within the said semi-cylindrical housing coaxially with and concentric to said inner auger, discharge conveying means connected to the said outer cylindrical housing, and means for selectively engaging said outer auger for rotation with said inner auger.

2. In material handling apparatus, a hopper body, a lower auger housing connected to said body, said auger housing having a semi-cylindrical section in upwardly open communication with the interior of said body and a cylindrical section extending therefrom outwardly of said body to define therewith a material discharge passageway, an inner auger rotatably mounted within the said semi-cylindrical section of said auger housing, an outer auger coaxial with and concentric to said inner auger mounted within the said semi-cylindrical section and extending into the said cylindrical section of said auger housing, and means including power means for selectively operating said inner auger independently or for operating both augers simultaneously.

3. The device of claim 2 wherein said inner auger is adapted to rotate at a speed different from the speed of rotation of said outer auger.

4. The device of claim 2 wherein side delivery conveying means are provided to transport the material delivered by said augers to a place of discharge removed from said body.

5. The device of claim 4 wherein said side delivery means is powered by the power means used to drive said augers and wherein a delivery chute is provided having angularly adjustable mounting engagement with said tubular section of said auger housing.

References Cited by the Examiner

UNITED STATES PATENTS

| 1,525,506 | 2/1925 | Lauterbur | 198—64 X |
| 1,533,997 | 4/1925 | Stinson. | |
| 2,509,543 | 5/1950 | Truax | 198—213 X |
| 2,854,451 | 5/1958 | Turner | 198—64 X |
| 3,186,602 | 6/1965 | Ricciardi | 198—64 X |

SAMUEL F. COLEMAN, *Primary Examiner.*